March 1, 1927.
A. JENSCHKE
1,619,422
AUTOMOBILE SHOCK ABSORBER
Filed Sept. 14, 1925   2 Sheets-Sheet 2
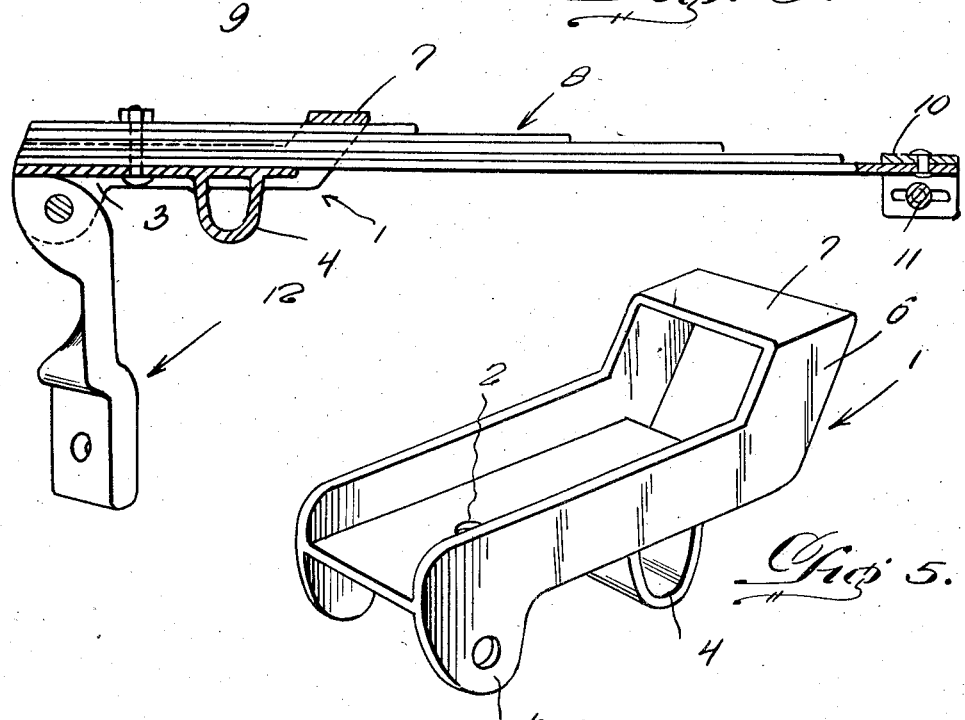
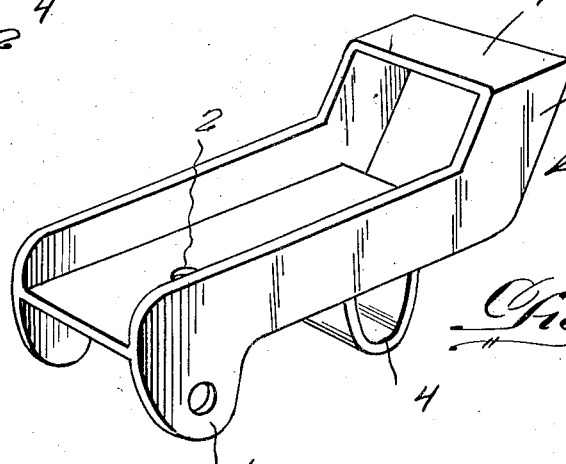
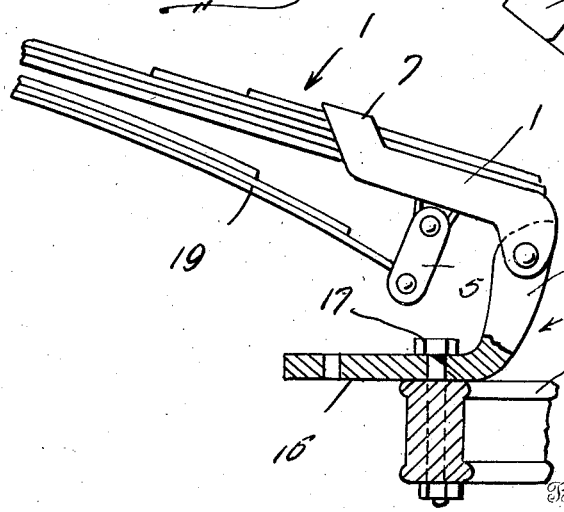
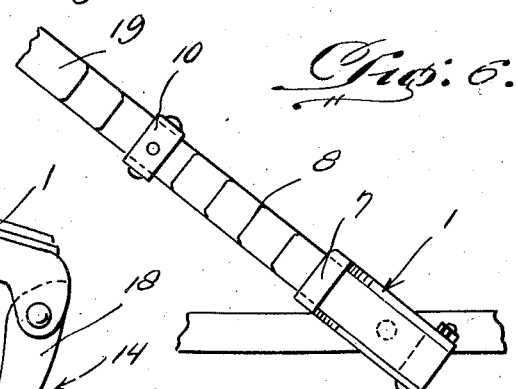
Inventor
A. Jenschke,
By Clarence A. O'Brien
Attorney Patented Mar. 1, 1927.

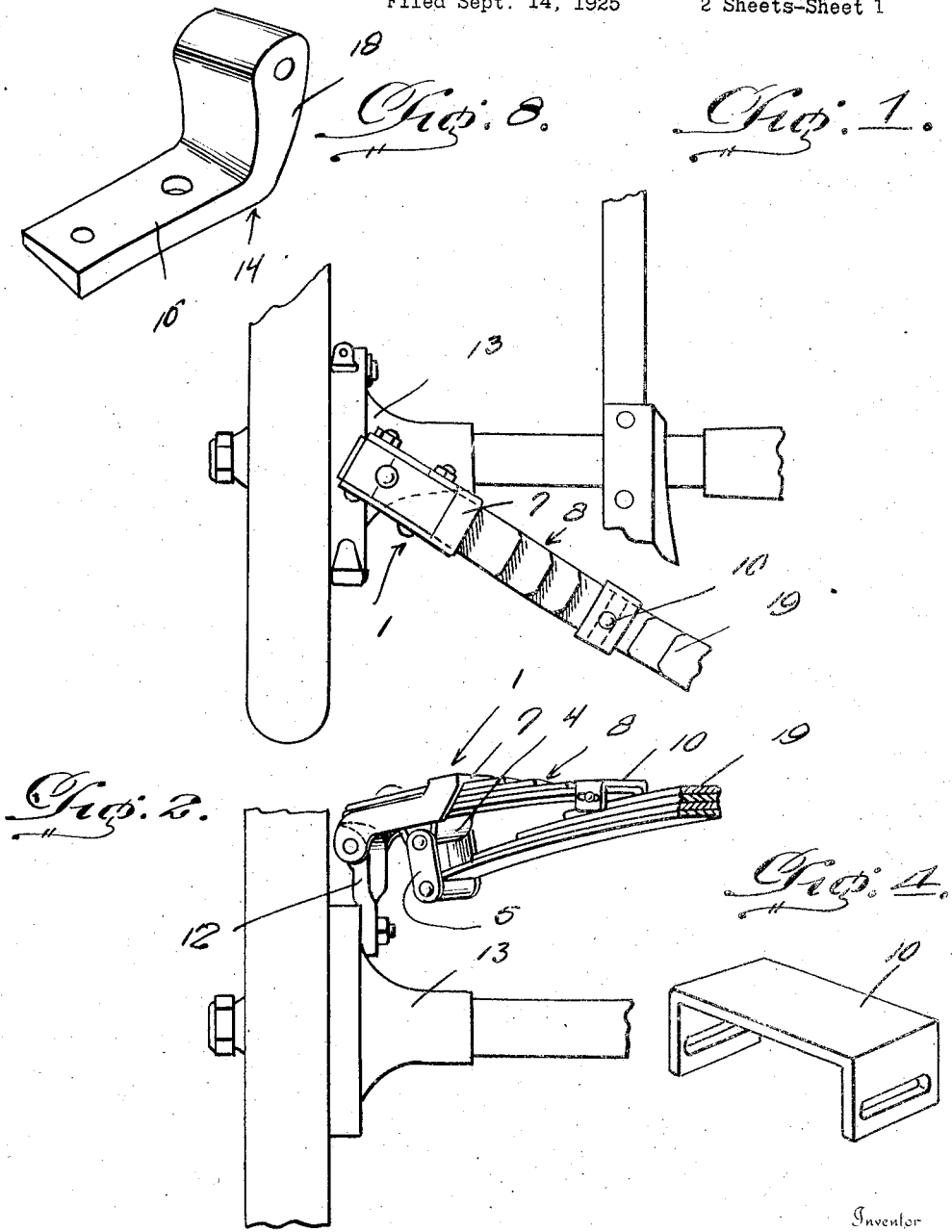

1,619,422

UNITED STATES PATENT OFFICE.

ADOLPH JENSCHKE, OF FREDERICKSBURG, TEXAS.

AUTOMOBILE SHOCK ABSORBER.

Application filed September 14, 1925. Serial No. 56,314.

This invention relates to an improved shock absorber for use upon automobiles.

Briefly, the improved device comprises a structure wherein especially constructed supports or spring perches are provided for mounting upon the automobile chassis, each perch being constructed to permit attachment of an auxiliary and relatively small leaf spring thereto so that the adjacent end of the main leaf spring may be connected therewith to provide a shock absorbing device of the cantilever type.

One feature of the present invention is an improved part to be hereinafter designated as a spring chair, the same constituting a mounting for the auxiliary leaf spring, and a connector between this spring and a supporting perch, and further serving as a carrier for a shackle which is connected with the main spring.

An equally important feature is the perch construction which permits application of the improved shock absorber without requiring alteration of the stock parts of the machine with which the shock absorbing device is associated.

Other features and advantages of the invention will become apparent from the following description and drawing.

In the accompanying drawing forming a part of this application and in which like numerals are employed to designate like parts throughout the same:

Figure 1 is a top plan view of the rear wheel and axle construction of a conventional form of automobile, showing one form of shock absorber such as is connected thereto.

Figure 2 is a rear elevation of the same.

Figure 3 is a detail sectional and elevational view on an enlarged scale of the shock absorbing device per se used upon the rear spring structure.

Figure 4 is a perspective view of an anti-friction roller carrying yoke.

Figure 5 is a perspective view of the auxiliary leaf spring chair.

Figure 6 is a top plan view of the front spring structure and front axle.

Figure 7 is an elevational and sectional view of Figure 6.

Figure 8 is a perspective view of one of the perches.

In the drawings, the portions of the conventional automobile shown represent the rear and front spring structures of an automobile of the Overland type, particularly the model embodying spring suspension means disposed in forwardly and rearwardly arched relation with respect to the front and rear axle, the automobile being known as the "Overland Four".

While the following description adapts the shock absorbing device to this particular kind of automobile, it is to be understood that it is not to be restricted to this purpose, for it is applicable to other forms of spring suspension means.

Considering the shock absorber per se, it will be seen that the same, in each instance, comprises a chair 1 which is plainly represented in Figure 5. Referring to this figure it will be seen that the chair is in the form of a channel, the bottom of which is formed with a bolt hole 2. At the outer end, this chair is provided with depending apertured ears 3 which serve a purpose to be hereinafter described. At the center and on the bottom, the chair is formed with a depending strap 4 which is shaped to provide a hanger for a shackle connector 5, as shown in Figures 2 and 7. It will be noted that the side walls of the channel are directed upwardly, as at 6, and are connected together as at 7 thus providing an upwardly offset and diagonally disposed U-shaped portion for coacting with the intermediate part of the auxiliary leaf spring 8. This leaf spring, as shown plainly in Figure 3, is made up of a plurality of comparatively short leaves arranged in superposed relation, with a connecting bolt 9 passing therethrough and through the opening 2 in the bottom of the chair. Mounted on the bottom or longest leaf of this auxiliary spring, by a rivet or the like, is a yoke 10 which carries an antifriction roller 11. The downwardly turned ends of the yoke are formed with slots in which the pintles or journals of the roller are mounted. Thus, at one end of the auxiliary spring is an anti-friction device, and at the opposite end is an especially constructed chair which is bolted thereto.

Although the same kind of shock absorber per se is adapted for use at both ends of the vehicle, different types of supports or connectors are necessary. Supplying the shock absorber to the rear for instance, a perch such as is indicated by the reference character 12 in Figures 2 and 3 is necessary. This has its end portion twisted laterally as indicated to adapt the perch for connection to the rear wheel brake structure 13. A different type of perch 14 is necessary for connection with the front axle 15, as shown in Figures 7 and 8. This comprises a casting having a horizontal portion 16 provided with spaced apertures for connection to the bolt 17, and an upstanding part 18 which is connected to the down turned ears 3 of the aforesaid chair.

In each instance the particular form of perch necessary is fastened to the existing part. Then the shackle 5 is connected with the hanger loop 4, and with the lowermost leaf of the main leaf spring 19. This disposes the auxiliary spring in superposed relation to the main spring so as to place the weight of the main spring on the auxiliary spring. The resilient action is permitted and facilitated by the sliding roller connection of the two springs.

It is believed that the description taken in connection with the drawings will enable persons skilled with structures of this class to obtain a clear understanding of the invention. Therefore, a more lengthy description is thought unnecessary.

While the preferred embodiment of the invention has been shown and described, it is to be understood that minor changes coming within the field of invention claimed may be resorted to if desired.

Having thus described the invention, what I claim as new and desire to secure by Letters Patent is:—

As a new product of manufacture, an automobile shock absorber comprising, in combination, a spring chair embodying a channel-shaped member having a diagonally disposed U-shaped part at one end forming a spring bridge, having depending apertured ears at its opposite end and on its bottom and an intermediate hanger loop on the center of its bottom, a mounting perch comprising a single casting having its opposite ends offset in lateral directions and formed with openings, one of said ends being pivotally confined between said ears, an auxiliary leaf spring having one end fitted into said chair between the side portions of the channel, said bridge extending transversely across the top leaf of the spring, a yoke connected to one of the leaves of said spring, and an anti-friction roller slidably and rotatably mounted on the free end portions of the arms of said yoke.

In testimony whereof I affix my signature.

ADOLPH JENSCHKE.